C. M. HARTMAN.
HOSE COUPLING.
APPLICATION FILED AUG. 10, 1916.

1,220,223.

Patented Mar. 27, 1917.

Witnesses

C. M. Hartman,
Inventor by C. A. Snow & Co.
Attorneys

UNITED STATES PATENT OFFICE.

CLARENCE M. HARTMAN, OF CROFTON, NEBRASKA.

HOSE-COUPLING.

1,220,223.　　　　Specification of Letters Patent.　　Patented Mar. 27, 1917.

Application filed August 10, 1916. Serial No. 114,266.

*To all whom it may concern:*

Be it known that I, CLARENCE M. HARTMAN, a citizen of the United States, residing at Crofton, in the county of Knox and State of Nebraska, have invented a new and useful Hose-Coupling, of which the following is a specification.

The device forming the subject matter of this application is adapted to be employed for holding together the constituent members of a coupler of that general kind which is used in the steam or other pipe line of a train.

The invention aims to provide a means for holding together the parts of a coupler which may be adjusted approximately to the required tightness, and then be adjusted and tightened up securely, so as to hold the parts of the coupler together.

The invention aims, particularly, to provide a novel connection between the ends of the flexible element or chain which circumscribes the constituent members of the coupler.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1:
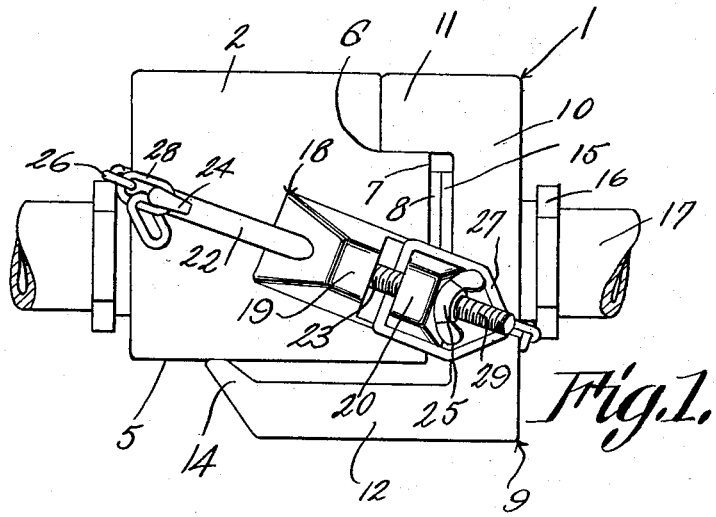
Figure 2:
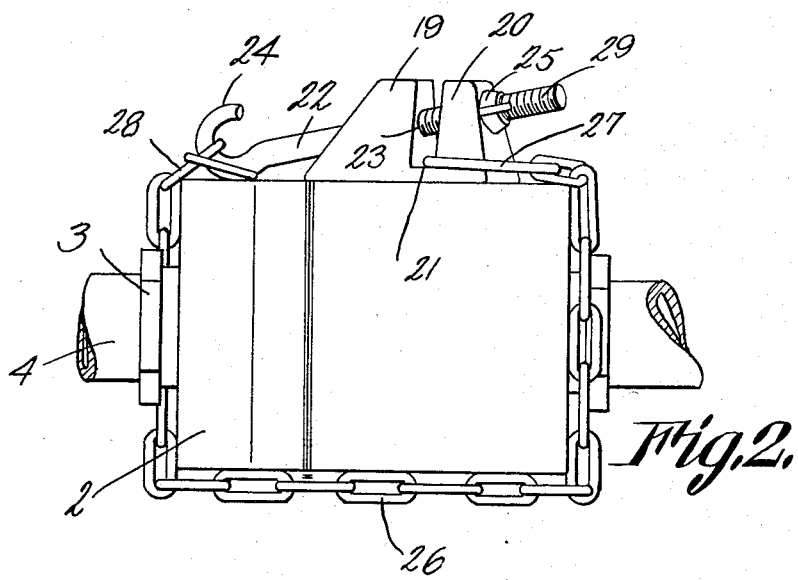

Figure 1 shows in top plan, a pipe coupler whereunto the device forming the subject matter of this application has been applied; and Fig. 2 is a side elevation of the structure shown in Fig. 1.

In the accompanying drawings, the numeral 1 indicates a coupler, which may be of any desired form. In the present instance, the coupler 1 is shown as comprising a member 2 carrying at its rear end a union 3 on which is assembled a flexible steam or train pipe 4. One side of the member 2 of the coupler is designated by the reference character 5. In the other side of the member 2 of the coupler, and adjacent its forward end, there is fashioned a recess 6 defining a projection 7 carrying a gasket 8 which is sometimes made of brass.

The other member of the coupler 1 is denoted by the numeral 9 and includes a head 10 carrying a gasket 15 coöperating with the gasket 8. The member 9 of the coupler includes a relatively short arm 11 received in the recess 6 of the member 2 of the coupler, and a longer arm 12 extending along the side 5 of the member 2 of the coupler, the arm 12 including a finger 14 bearing on the side 5 of the coupler, as clearly indicated in Fig. 1 of the drawings. It is with such a coupler, or with a similar coupler, that the device forming the subject matter of this application is assembled. The member 9 of the coupler is provided at its rear end with a union 16, carrying a flexible steam or train pipe 17. The unions 16 and 3 may be described as projections on the outer ends of the members 9 and 2 of the coupler, respectively.

In carrying out the present invention there is provided a connector 18 which may be in the form of a block, the same having upstanding projections 19 and 20 defining a vertical notch 21. Mounted to slide freely in openings 23 in the projections 19 and 20 is a rod 22 provided at one end with a hook or like connecting device 24. At the other end of the rod 22, the same is threaded as shown at 29, to receive a wing nut 25, bearing against the outer face of the projection 20 of the connector 18. The numeral 26 designates a flexible element, preferably a chain. The chain 26 extends along the lower faces of the members 2 and 9 of the coupler, one end of the chain extending upwardly along the rear face of the member 2 of the coupler, to one side of the union 3, and the other end of the chain 26 extending upwardly along the rear face of the part 9 of the coupler, the last specified end of the chain engaging the union 16, as clearly shown in Fig. 1. It is to be observed that the end portions of the chain 26 engage opposite sides of the unions 3 and 16. One end of the chain 26 terminates in an enlarged link 27, which is slipped over the projection 20 of the connector 18, the link 27 lying below the rod 22. The rod 22, thus, serves to hold the link 27 on the projection 20. Any of the other links 28 of the chain 26 may be engaged with the hook 24.

In practical operation, the chain 26 is placed around the constituent members 2 and 9 of the coupler, as shown in the drawing. One of the links 28 is engaged with the hook 24, and the wing nut 25 is rotated, the wing nut bearing against the projection 20. The rod 22 thus is moved endwise, and the chain 26 is tightened up.

The device forming the subject matter of this application is of few parts and is simple in construction. The connector 18 is supported on one or both of the members 2 and 9 of the coupler and, by proper manipulation of the wing nut 25, the flexible element 26 may be tightened up, so as to hold the gaskets 8 and 15 in closed and intimate contact.

It is to be observed that the rod 22 is supported in both of the projections 19 and 20. Owing to this fact, and because the rod 22, as clearly shown in Fig. 2, is inclined with respect to the horizontal, a bending of the rod will not be likely, when the nut 25 is rotated. Further, owing to the construction above mentioned, that portion of the rod 22 which carries the nut 25 is elevated sufficiently, so that the nut may be rotated.

Having thus described the invention, what is claimed is:—

A tightening device for a train pipe coupler, comprising a connector including spaced projections defining a notch; a rod slidable in both projections and extending across the notch; a flexible element connected at one end with the rod, and provided at its other end with a link passing through the notch and engaging one projection; and a tightening means on the rod, and engaging one projection.

In testimony that I claim the foregoing as my own, I have hereto affixed my signature in the presence of two witnesses.

CLARENCE M. HARTMAN.

Witnesses:
J. L. MAYFREED,
R. C. BARNETT.

Copies of this patent may be obtained for five cents each, by addressing the "Commissioner of Patents, Washington, D. C."